United States Patent [19]

Noe et al.

[11] Patent Number: 5,019,426

[45] Date of Patent: May 28, 1991

[54] TOPICAL TREATMENT FOR SEALING CARBON AND GRAPHITE SURFACES

[75] Inventors: James B. Noe, Florence, Ala.; Charles C. Chiu, Strongsville, Ohio

[73] Assignee: Union Carbide Corporation, Danbury, Conn.

[21] Appl. No.: 274,778

[22] Filed: Nov. 23, 1988

Related U.S. Application Data

[63] Continuation-in-part of Ser. No. 62,635, Jun. 16, 1987, abandoned.

[51] Int. Cl.$^5$ ............................................. B05D 3/02
[52] U.S. Cl. .................................. 427/314; 427/379; 427/385.5
[58] Field of Search .................. 427/314, 379, 385.5, 427/355, 369, 228

[56] References Cited

U.S. PATENT DOCUMENTS

| | | |
|---|---|---|
| 238,806 | 3/1881 | Peto .................................... 427/314 |
| 2,749,254 | 6/1956 | Slyh .................................... 427/228 |
| 2,884,391 | 4/1959 | Winter et al. ...................... 260/28.5 |
| 2,909,450 | 10/1959 | Goldstein ........................... 117/161 |
| 3,167,447 | 1/1965 | Tully .................................. 427/228 |
| 3,416,944 | 12/1968 | Pirrung et al. .................... 427/228 |
| 3,505,090 | 4/1970 | Pinchbeck .......................... 106/284 |
| 3,632,385 | 1/1972 | Schmitt et al. .................... 427/228 |
| 3,936,535 | 2/1976 | Böder ................................. 427/228 |
| 4,103,046 | 7/1978 | Taniguchi .......................... 427/314 |
| 4,109,033 | 8/1978 | Blankenship et al. ............ 427/314 |
| 4,366,191 | 12/1982 | Gistinger et al. .................. 427/228 |
| 4,395,441 | 7/1983 | Furnam ............................... 427/314 |
| 4,451,577 | 5/1984 | Coss .................................... 502/167 |
| 4,479,913 | 10/1984 | Akerberg et al. ................. 264/29.5 |
| 4,543,373 | 9/1985 | Krawiec ............................. 523/144 |
| 4,543,374 | 9/1985 | Menting ............................. 523/144 |
| 4,759,977 | 7/1988 | Fukuda et al. .................... 427/228 |
| 4,786,524 | 11/1988 | Ardary et al. ..................... 427/228 |

OTHER PUBLICATIONS

D. G. Zimcik, et al., "Development of Low Distortion Tooling for High Precision Space Components", SAMPE Journal, May/Jun. 1987, pp. 11 and 16.

*Primary Examiner*—Janyce Bell
*Attorney, Agent, or Firm*—E. Lieberstein

[57] ABSTRACT

A method of sealing the surfaces of porous carbon and graphite articles by impregnation at ambient pressure using a treating solution comprising a high temperature polymerizable liquid resin. The liquid treating solution, when upon the surface of the article, is of sufficiently low viscosity to allow infiltration of the treating solution into the pores of the surface of the article. The treated article then undergoes a controlled heating cycle, which cures the infiltrated resin in situ. Subsequent treatments and surface conditioning techniques are utilized to produce a thin, level, liquid and gas impervious coating on the surfaces of the article.

12 Claims, No Drawings

TOPICAL TREATMENT FOR SEALING CARBON AND GRAPHITE SURFACES

This application is a continuation-in-part of copending application Ser. No. 062,635, filed on June 16, 1987, now abandoned.

FIELD OF THE INVENTION

The present invention relates to topical treatments for sealing carbon and graphite surfaces. More particularly, the present invention relates to an improved method of impregnating and coating the surfaces of porous carbon and graphite articles in order to eliminate porosity.

BACKGROUND OF THE INVENTION

In the production of parts of composite materials such as graphite-epoxy composite parts for use in the aircraft and space industry, it is necessary to employ molds which are devoid of open porosity on the working surfaces. The reason for this requirement is essentially, two-fold, namely, (1) to prevent intrusion of liquid resin into the mold media and (2) to prevent gas infiltration through the mold when a high pressure differential is applied across the mold cross-section during the vacuum forming of the composite part.

Because of its superior dimensional stability over wide ranges of temperature variation and its high temperature tolerance, graphite is an ideal candidate for use as the mold forming material in the production of these composites. However, fine-grain graphite, as manufactured and machined, has undesirable surface porosity as well as dusting and poor wear characteristics which severely limit its use in this particular application.

A common method of eliminating porosity in graphite materials is to impregnate the graphite shape with a liquid resinous material which, when cured, fills or blocks virtually all of the open pores. In these impregnation processes, the graphite article is placed in an autoclave. The autoclave is evacuated to remove gases from the porous structure of the shape, and insure impregnation by the liquid resinous material. Generally, the electrode is then contacted with the resinous material under pressure to assist infiltration of the resin into the pores of the electrode. Following impregnation, the resin is cured by heating the impregnated electrodes. Multiple impregnation/curing cycles, usually three or more, are required to achieve complete sealing of porosity.

U.S. Pat. No. 2,909,450, issued to Goldstein on Oct. 20, 1959, discloses a method of treating a porous article, such as a carbon electrode, to eliminate its porosity. The article is impregnated with a solution containing 65-99% by weight of furfuryl alcohol, 0-25% by weight of furfural, 0.5-10% by weight of a zinc chloride catalyst and the balance water. The impregnation is carried out by immersing a carbon electrode in the solution within a treating cylinder and carbon electrode is subjected to a vacuum. Thereafter, the electrode, while immersed in the solution, is subjected to a pressure of 150 psi for one hour. The impregnated electrode is then removed from the treating cylinder and placed in an oven at 95° C. to 100° C. to cure for 18 to 24 hours. This procedure may be repeated one or more times until the porosity of the carbon electrode is essentially eliminated.

These prior art methods, however, suffer from the disadvantage in that they require treatment of the graphite articles under vacuum and then pressure in autoclaves or similar equipment. Certain precision machined graphite shapes and large parts are not easily processed in autoclave type equipment because of their configuration or size. Thus, these parts are difficult or impossible to treat by these prior-art methods. Another problem is that application of the resinous material to the part surface is uneven with some excess resinous material typically remaining upon the surface, forming a uneven coating with surface accumulations of resin. After curing of the resin, these surface accumulations and the uneven coating on the surface result in loss of the fine dimensional tolerances to which the graphite parts are machined.

OBJECTS OF THE INVENTION

It is therefore an object of the invention to provide a method for impregnating graphite articles to eliminate the surface porosity of the articles.

It is additionally an object of the invention to provide a method for impregnating graphite articles which provides thin, uniform, level applications of the resinous material on the surface of the porous carbon or graphite article, such that the machined tolerances of the article are not lost when the resin is cured.

It is also an object of the invention to provide a method for impregnating carbon and graphite articles which does not require vacuum and/or pressure equipment.

Additional objects of the invention will become evident in the discussion that follows.

SUMMARY OF THE INVENTION

An embodiment of this invention is a method for sealing the surface of a porous carbon or graphite article which comprises the steps of:

(a) applying a thermosetting treating solution upon the surface of a porous carbon or graphite article, wherein the temperature of the surface of the article is below the cure temperature of the treating solution, and the viscosity of the treating solution upon the surface of the article is sufficiently low to permit infiltration of the treating solution into the pores of the article at ambient pressure;

(b) allowing the treating solution to infiltrate into the pores of the article, wherein the treating solution is applied for a sufficient number of times for the rate of infiltration of the treating solution into the pores of the article to decrease to a predetermined minimum;

(c) removing any excess treating solution from the surface of the article; and (d) heating the surface of the article to slowly raise the temperature of the impregnated resin to the curing temperature of the resin to polymerize the resin in situ within the pores of the article to form an essentially non-porous surface on the article; wherein steps (a) through (d) inclusive are carried out at ambient pressure.

The treating solution of the invention comprises a suitable polymerizable resin which has a sufficiently low viscosity upon the surface of the article to allow infiltration of the pores of the article at ambient pressure, i.e. without assistance of an applied pneumatic pressure to assist in the infiltration of the solution. The treating solution is drawn by capillary action into the open pores of the carbon or graphite article without assistance from pressure, or without previously drawing gasses out the pores with vacuum. For fine grained graphite and carbon articles, a viscosity below about 100 centipoise, measured at the temperature of the surface of the article, is generally suitable.

The treating solution is thermosetting, i.e. or curable by heating to a cure temperature, at which temperature there is a rapid polymerization of the treating solution. The cure temperature is higher that the temperature of the surface when the treating solution is applied, that is, the treating solution is sufficiently stable or nonreactive at the temperature of the surface so as to permit infiltration of the solution into the pores of the article and removal of the excess solution. The polymerizable resin used to form the treating solution, should in its cured state be stable at temperatures to which the impregnated article is exposed during use. In addition the resin must be capable of being formed into a treating solution of sufficiently low viscosity at the surface temperature of the article. As resins and polymerizable solutions are typically solid or have a high viscosity, the viscosity of such must be reduced, preferably by heating the surface of the article before application of the treating solution. In addition, the viscosity of the treating solution may be reduced by dilution with a suitable solvent.

The treating solution is applied to the surface and allowed to soak or infiltrate into the pores of the surface. The cycle of applying the treating solution and allowing the solution to infiltrate is preferably repeated to maximize the amount of treating solution infiltrated into the pores. The number or repetitions can be determined by routine experimentation by observing the rate at which the treating solution is absorbed into the article surface, and repeating application of the treating solution until the rate of infiltration slows to a predetermined value.

Any excess solution upon the surface which has not infiltrated into the pores is then removed to provide a surface essentially free of accumulations of the treating solution.

After removal of the excess solution, the infiltrated treating solution is then cured by heating the surface of the article up to the curing temperature to rapidly polymerize or cure the resin, forming an essentially non-porous surface on the article.

Preferably, the article is burnished to provide a smooth finish coating upon the article by applying treating solution to the non-porous surface of the article to form a layer or coating of treating solution upon the surface, burnishing the layer of treating solution to achieve level uniform filling of pores upon the surface, repeating the application and burnishing until the porosity at the surface is essentially eliminated, and thereafter heating the coated layer to slowly raise the temperature thereof to the polymerization temperature of the resin, thereby curing the resin to produce a level, impervious surface film which is chemically cross-linked with the resin impregnant filling the pores of the article.

Another embodiment of the present invention is a carbon or graphite article produced by the method of the invention having its surface impregnated with a thermoset resin to a depth of about 30 to 50 millimeters with the remaining volume of the article essentially free of the thermoset resin. The article has a thin, level, liquid and gas impervious surface coating of the thermoset resin which is chemically cross-linked with the thermoset resin impregnant in the pores of the article.

It has been unexpectedly found in accordance with the invention that the surfaces of a porous carbon or graphite article can be effectively sealed by application of a treating solution containing a high temperature polymerizable liquid resin at ambient or atmospheric pressure. In addition, the sealing can be accomplished without uneven coatings and residues upon the surface which alter the outer dimensions of the article. The unexpected results of the invention are achieved by applying polymerizable treating solution upon the surface of the article which has a low viscosity upon the surface, and allowing it to infiltrate the pores of the surface.

The process of the invention is carried out at ambient pressure. This eliminates the need for high-pressure autoclaves required in prior-art impregnation processes. With no autoclave to limit the size or the configuration of the article, it is possible to treat articles which are much larger and of a more complex configuration. In addition, the treating solution can be applied by methods not generally available, or which are impractical in an autoclave environment, such as complex spraying techniques, brushing, wiping, and hand application of the solution. This allows a more uniform application of the treating solution to the surface, and permits treatment of graphite and carbon parts with complex geometries which cannot be evenly treated in an autoclave. In addition, without the autoclave, it is possible to remove excess treating solution from the surface before the treating solution is polymerized. This further permits a more even coating upon the surface of the article than is possible in methods using an autoclave. With an even uniform coating, with no accumulations of the treating solution on the surface, it is, therefore, possible to maintain fine machined tolerances to a degree not possible with prior art methods.

It is unexpected that, notwithstanding the fact that a pressure and vacuum cycle was not used to assist impregnation, that the surface of the carbon or graphite shape is effectively sealed. In the typical practice of the invention, using graphite usually used for tools, the surface is sealed to a depth estimated to be approximately 30–50 millimeters of the cured or thermoset resin. In contrast, prior methods of pressure impregnation and curing such as in the case of the Goldstein patent, supra, utilizing autoclave equipment and the like, ordinarily result in filling of substantially all of the pores throughout the body of the article. By sealing only the surface portions, the present invention permits a significant saving in equipment and material costs. The present method constitutes a significant improvement in that precision machined shapes and large parts which are not easily processed in autoclave equipment may be treated to fill or block all surface porosity, providing apparent total imperviousness. Furthermore, precision machined carbon or graphite surfaces may be treated to achieve thin, uniform, level coatings which do not significantly alter the dimensions of the article, which is normally not possible with autoclave processing.

DESCRIPTION OF THE INVENTION

A number of high temperature polymerizable liquid resins of low viscosity can be used in the method of the invention. For temperature stability up to about 200° C., a furan or phenolic resin has been found to be practical. A preferred liquid resin is furfural or furfuryl alcohol. Furfuryl alcohol is particularly preferred for use in the method of the invention because of its known compatibility with carbon and graphite, and the ability to easily reduce its viscosity to allows infiltration of the pores at ambient pressure.

Furan and phenolic resins are typically cured using a heat activated catalyst system. The preferred furfuryl alcohol liquid resin is a reactive compound which can be resinified or cured by a number of heat activated catalysts. The most suitable catalysts, however, are acidic catalysts. Mineral acids, strong organic acids, Lewis acids and acyl halides are very active catalysts for this purpose. Co-reactive catalysts such as phthalic anhydride may also be utilized. Illustrative of the many catalysts that can be used are the following: toluene sulfonic acid, phenol sulfonic acid, acid chlorides, benzene sulfonic acid, sulfonic acid salts, phthaloyl chloride, hydrochloric acid, phosphoric acid, maleic acid, sulfuric acid and zinc chloride. It has been found, however, that furfuryl alcohol catalyzed with zinc chloride exhibits superior sealing capability at relatively low curing temperatures and, for this reason, zinc chloride is the preferred catalyst for use in the practice of the invention.

A catalyst-activated treating solution, such as furfuryl alcohol, is prepared by admixing at ambient temperature a major proportion of the high temperature polymerizable liquid resin and a minor proportion of the heat activated catalyst and water. In general, the catalyst should be employed in amounts which will insure as low a viscosity when applied to a heated surface of the article, in order to facilitate optimum penetration into the surface of the graphite. Typically, a room temperature (25° C.) viscosity of about 5 centipoise has been found to be suitable, with additional heating of the surface to about 60° C. to further reduce the viscosity of the treating solution when it is applied to the surface. In the case of the preferred resin-catalyst system, it is recommended to employ an aqueous zinc chloride solution catalyst in relative weight proportions of from about 2% to 10% catalyst solution to furfuryl alcohol.

For fabrication of certain graphite tools and molds, particularly molds used in the fabrication of molded composite aircraft components, high temperature stability above 200° C. is required. Therefore, furfuryl alcohol resins, and the like are not suitable for these applications, and a suitable resin resistant to higher temperatures must be used. For a temperature stability up to about 400° C., the treating solution may comprise, for example, polyimides, polybenzimidazoles, bismaleimides, polyarylketones, and polyphenylene sulfides. A preferred class of high-temperature polymeric resins are fluorinated polyimides.

High temperature polymerizable resins are often in the form of a solid, and must be dissolved in a compatible solvent to reduce the viscosity. Suitable solvents for reducing the viscosity of the treating solution include any solvent compatible with the particular resin being used. Suitable solvents for solutions containing fluorinated polyimides, include, for example, methylethylketone, and 1-methyl-2-pyrolidinone. A suitable treating solution based upon fluorinated-polyimide resins is a solution as used in Example II, below.

Before application of the treating solution, the surfaces of the porous carbon or graphite article are thoroughly cleaned using known procedures in order to remove any surface contaminants as well as any loose graphite particles and dust that may remain after the machining operation.

If the surface of the article is to be heated to reduce the viscosity, the cleaned carbon or graphite article is heated after cleaning by placing it in an oven, e.g., a forced draft oven. The article is heated at ambient pressure to an elevated temperature which is high enough to reduce the viscosity of the treating solution upon contact with the heated surface of the article. The preheat temperature to be used with any given treating solution must be chosen carefully to achieve maximum viscosity reduction, or "thinning" of the treating solution while avoiding rapid cross-linking of the resin. For the zinc chloride catalyzed furfuryl alcohol system, the optimum preheat temperature is about 60° C.

The treating solution is applied uniformly to the surfaces of the porous carbon or graphite article at ambient pressure using any one of several known techniques. The solution may be applied by spraying or wiping with a brush or cloth, for example, or by immersing the article within a bath of the treating solution. In any case, the low viscosity treating solution will be drawn by capillary action into the open pores of the carbon or graphite article.

The application of treating solution is applied to the surface until the surface appears to be substantially saturated with treating solution. This typically requires repeated applications as the treating solution infiltrates into the surface. Generally, the treating solution is applied to the surfaces of the article 10 to 14 times, or until absorption slows to a predetermined minimum, for example, where about five minutes pass before dry spots appear.

After the treating solution is applied to the article, any excess solution remaining upon the surface, i.e. solution which has not soaked or infiltrated into the surface, is removed to insure an even surface upon the final article and to prevent undesirable accumulations which change the outer dimension of the article. The solution may be removed by any suitable means, such as wiping by cloth rags.

The carbon or graphite article with its saturated but dry surface is then placed in an atmospheric pressure oven and heated slowly to an elevated temperature which is sufficient to cure the impregnated resin within the pores of the article. Preferably, the article is heated to curing temperatures using different heating rates in a step-wise fashion with various hold periods at intermediate temperatures.

For furan based treating solutions the curing temperature is about 200° C. Successful curing has been achieved with heating rates ranging from about 5° C./hr. to about 25° C./hr. More rapid curing may result in resin exuding from the article surfaces which compromises the dimensional precision of the article. Table I shows a suitable schedule for heating the impregnated carbon or graphite article with furan-based treating solutions;

TABLE I

HEATING SCHEDULE FOR CURING FURAN BASED TREATING SOLUTIONS

| Start Temperature | Rate | End Temperature | Hold |
|---|---|---|---|
| 60° C. | — | — | One Hour |
| 60° C. | 22° C./Hour | 140° C. | — |
| 140° C. | 34° C./Hour | 200° C. | — |
| 200° C. | — | — | One Hour |

For polyimide-based treating solutions the curing temperature is about 240° C. Successful curing has been achieved with heating rates ranging from about 5°

C./hr. to about 25° C./hr. Table II shows a suitable schedule for heating the impregnated carbon or graphite article with fluorinated polyimide-based treating solutions. If the article with the non-porous surface is to used in temperatures above 240° C., the solution treated surface must be further post-cured to a temperature between about 350° C. and about 450° C., preferably near about 410° C., at a heating rate between about 25° C./hr and about 60° C./hr.

TABLE II

HEATING SCHEDULE FOR CURING FLUORINATED POLYIMIDE-BASED TREATING SOLUTIONS

| Start Temperature | Rate | End Temperature | Hold |
|---|---|---|---|
| 65° C.–240° C. | 25° C./hour | 240° C. | 4 hours |

It may be necessary, where a very low degree of porosity is required, to repeat one or more times the cycle of applying coat of treating solution, removing excess solution, and curing the solution.

A "finish" coating may be applied to the impregnated carbon or graphite article after curing, which serves to fill any residual porosity and to level the article surfaces. In one embodiment, using furan based treating solutions, the resin impregnated surfaces of the article are heated to an elevated temperature which is below the polymerizing temperature of the resin in the presence of the catalyst, i.e., about 45° C. in the case of the preferred furfuryl alcohol-zinc chloride system. The heated resin impregnated surfaces of the article are then coated uniformly with a layer of the treating solution, after which the surface is hand burnished with a damp cloth. During the burnishing the polymerization may advance due to the heat in the article, which may be further heated to assist further polymerization of the resin. By hand burnishing, it is possible to produce a thin, level, glassy surface film on the article surfaces. The solution is reapplied and burnished several or more times until the porosity at the surfaces is essentially eliminated. The applied solution is then heated to slowly raise its temperature to complete the polymerization of the resin, thereby curing the resin to produce a thin, level, uniform, liquid and gas impervious film or coating on the surface of the article. The resulting film on the surface is not a superficial coating, but is chemically cross-linked with the resin impregnant filling the pores of the article.

Preferably the same treating solution is used throughout treatment of the article. However, different treating solutions may be used in repeated applications of the treating solutions, or a different treating solution may be used to form a burnished finish coat.

The following examples will serve to further illustrate the practice of the invention.

EXAMPLE I

A treating solution was prepared by admixing approximately 95 weight percent furfuryl alcohol, 2.5 weight percent anhydrous zinc chloride powder and 2.5 weight percent deionized water. The mixing sequence was as follows: the zinc chloride powder was first dissolved in the water and the aqueous zinc chloride solution so prepared was then added to the furfuryl alcohol.

This treating solution was used to surface impregnate a number of graphite articles which had been previously machined to the desired shape and thoroughly cleaned to remove all surface contaminants and loose graphite particles and dust. The graphite articles were then heated in an atmospheric pressure forced draft oven to a temperature of 60° C. After the articles had stabilized at this temperature, they were removed from the oven and placed in a well ventilated and lighted work area.

A layer of the treating solution was then applied to the preheated graphite articles at room temperature by brushing the solution uniformly onto the surfaces thereof. The solution was allowed to soak into the article surfaces and another layer of the solution was applied and allowed to absorb in the same manner. This procedure was repeated an average of 10 to 14 times until absorption became quite slow, i.e., where about five minutes elapsed before dry spots appeared. After the final application of the treating solution, the articles were allowed to set for about 20 to 30 minutes. Any remaining liquid was then wiped off the surfaces. In those cases where liquid resin built up on the surfaces, it was softened and removed using a cloth dampened with treating solution.

The graphite articles were then heated in an atmospheric oven to cure the impregnated resin using the same heating schedule shown in Table I. The cured articles were then removed from the oven and allowed to cool to room temperature.

Thereafter, the articles were reheated again to a temperature of about 45° C. Any dust or residue on the surfaces of the articles from the previous cure cycle were wiped off and removed. A generous coating of the treating solution was then applied to the entire surface of each graphite article. Only minimal absorption was evident. The coated surfaces of the articles were then burnished with a solution dampened cloth to achieve level uniform filling of the surface porosity. In those cases where the porosity reappeared, an additional layer or layers of the treating solution were then reapplied with repetition of the burnishing. The coating became tacky as the final layers of the solution were applied along with burnishing. Excessive fuming and build up of the coating was avoided in all cases. After the finish coat was complete, the articles were again heated using the same curing schedule in order to cure the resin in the final coat.

EXAMPLE II

A treating solution was prepared by admixing approximately 14 weight percent of a fluorinated polyimide resin, and 86 weight percent of a solvent. The fluorinated polyimide resin was available under the trademark "Thermid FA-700", from National Starch and Chemical Corporation. The solvent was a mixture of 80 weight percent methylethylketone and 20 weight percent 1-methyl-2-pyrolidinone. This treating solution was used to surface impregnate a number of graphite articles which had been previously machined to the desired shape and thoroughly cleaned to remove all surface contaminants and loose graphite particles and dust.

The articles were preheated to a temperature of 65° C. A layer of the treating solution was then applied to the preheated surfaces of graphite articles at room temperature by brushing the solution uniformly onto the surfaces thereof. The solution was allowed to soak into the article surfaces and another layer of the solution was applied and allowed to absorb in the same manner. This procedure was repeated an average of 10 to 14 times until absorption became quite slow, i.e., five minutes to show dry spots, for example. After the final application of the treating solution, the articles were allowed to set for about 20 minutes to one-half hour. Any remaining liquid was then wiped off the surfaces. In those cases where liquid resin built up on the surfaces, it was softened and removed using a treating solution dampened cloth.

The graphite articles were then heated in an atmospheric oven to cure the impregnated resin using the same heating schedule or cycle set forth in Table II. The cured articles were then removed from the oven and allowed to cool to room temperature.

Although the experimental work described in the foregoing examples was carried out using fine-grained graphite articles, which typically have a maximum grain size of about 0.006 inches, the method of the invention is not so limited but is broadly applicable as well to the impregnation and sealing of coarser grade carbon and graphite materials. Moreover, it will be understood that other catalyst solutions may be employed instead of those used in the examples. It will be recognized by those skilled in the art that many variations are possible without departing from the scope and spirit of this invention, and that the invention, as described by the claims, is intended to cover all changes and modifications of the invention which do not depart from the spirit of the invention. Other variations and modifications of the present invention will of course occur to those skilled in the art.

What is claimed is:

1. A method for converting a molded carbon or graphite porous body into a carbon or graphite structure having a nonporous surface comprising the steps of:
   (a) forming a low viscosity treating solution composed of a polymerizable resin selected from the group consisting of polyimides, polybenzimidazoles, bismaleimides, polyarylketones, and polyphenylene sulfides dissolved in a solvent;
   (b) applying said treating solution to the surface of said carbon or graphite porous body;
   (c) repeating step (b) for a sufficient number of times until the porosity of the surface of said carbon or graphite body is essentially eliminated; and
   (d) treating the surface of the carbon or graphite body to slowly raise the temperature at the surface to a temperature between about 240° C. and 450° C. and at a heating rate between 25° C. per hour and 60° C. per hour to polymerize the resin in situ without carbonizing said resin so as to form an essentially carbon or graphite body with a non-porous surface.

2. The method of claim 1 wherein the polymerizable resin is a fluorinated polyimide.

3. The method of claim 1, wherein the polymerizable resin is solid resin before being dissolved in the solvent.

4. The method of claim 1 wherein the solvent is selected from the group consisting of methylethylketone, and 1-methyl-2-pyrolidinone.

5. The method of claim 1 wherein the solvent comprises methylethylketone and 1-methyl-2-pyrolidinone.

6. The method of claim 1 wherein the solvent comprises 80 weight percent methylethylketone and 20 weight percent 1-methyl-2-pyrolidinone, based upon the weight of the solvent.

7. The method of claim 1 wherein the treating solution comprises a fluorinated polyimide, methylethylketone, and 1-methyl-2-pyrolidinone.

8. The method of claim 7 wherein the treating solution comprises 14 weight percent of a fluorinated polyimide, and 86 weight percent of the solvent, based upon the total weight of the treating solution.

9. The method of claim 1, wherein the surface of the article is heated before coating with the treating solution.

10. The method of claim 1, wherein the impregnated surface of the article is heated at a rate of about 25° C. per hour to a final temperature of about 240° C.

11. The method of claim 1 wherein the non-porous surface produced in step (d) is further heated to a temperature above the cure temperature.

12. The method of claim 11 wherein the non-porous surface is further heated to about 410° C., at a heating rate between about 25° C. per hour and 60° C. per hour.

* * * * *